(12) United States Patent  
Gaugler

(10) Patent No.: US 10,804,506 B2  
(45) Date of Patent: Oct. 13, 2020

(54) BUTTON CELL HAVING WINDING ELECTRODE AND METHOD FOR THE PRODUCTION THEREOF

(71) Applicant: Varta Microbattery GmbH, Ellwangen (DE)

(72) Inventor: Winfried Gaugler, Ellwangen (DE)

(73) Assignee: VARTA MICROBATTERY GMBH, Ellwangen (DE)

( * ) Notice: Subject to any disclaimer, the term of this patent is extended or adjusted under 35 U.S.C. 154(b) by 106 days.

(21) Appl. No.: 15/433,654

(22) Filed: Feb. 15, 2017

(65) Prior Publication Data

US 2017/0187008 A1 Jun. 29, 2017

Related U.S. Application Data

(62) Division of application No. 13/378,117, filed as application No. PCT/EP2010/058637 on Jun. 18, 2010, now Pat. No. 9,799,858.

(30) Foreign Application Priority Data

Jun. 18, 2009 (DE) .......... 10 2009 030 359  
Dec. 31, 2009 (DE) .......... 10 2009 060 800

(51) Int. Cl.  
*H01M 2/02* (2006.01)  
*H01M 2/04* (2006.01)  
(Continued)

(52) U.S. Cl.  
CPC ....... *H01M 2/0222* (2013.01); *H01M 2/0227* (2013.01); *H01M 2/0413* (2013.01);  
(Continued)

(58) Field of Classification Search  
CPC ............ H01M 2/0222; H01M 2/0227; H01M 2/0413; H01M 2/0439; H01M 2/06;  
(Continued)

(56) References Cited

U.S. PATENT DOCUMENTS 3,069,489 A 12/1962 Carmichael et al.  
3,748,182 A 7/1973 Brown  
(Continued)

FOREIGN PATENT DOCUMENTS

CN 1184338 6/1998  
CN 1224934 8/1999  
(Continued)

OTHER PUBLICATIONS

The English language machine translation of Higuchi et al. JP 2008-262825 in pdf format (Year: 2008).*  
(Continued)

*Primary Examiner* — Jonathan G Jelsma  
*Assistant Examiner* — Omar M Kekia  
(74) *Attorney, Agent, or Firm* — Leydig, Voit & Mayer, Ltd.

(57) ABSTRACT

A button cell includes a housing consisting of two metal housing halves, an electrode separator assembly in the form of a preferably spiral-shaped winding inside the housing, and metal conductors which electrically connect the electrodes of the assembly to the housing halves, wherein at least one of the conductors is connected to the respective housing half by welding.

20 Claims, 5 Drawing Sheets

(51) Int. Cl.
*H01M 2/06* (2006.01)
*H01M 2/26* (2006.01)
*H01M 10/04* (2006.01)
*H01M 10/0587* (2010.01)
*H01M 10/0525* (2010.01)

(52) U.S. Cl.
CPC ........... *H01M 2/0439* (2013.01); *H01M 2/06* (2013.01); *H01M 2/263* (2013.01); *H01M 10/0427* (2013.01); *H01M 10/0436* (2013.01); *H01M 10/0587* (2013.01); *H01M 10/0525* (2013.01); *Y10T 29/4911* (2015.01)

(58) Field of Classification Search
CPC ............. H01M 2/263; H01M 10/0436; H01M 10/0525; H01M 10/0587; H01M 10/0427; Y10T 29/4911
USPC ........................................................ 429/94
See application file for complete search history.

(56) References Cited

U.S. PATENT DOCUMENTS

| | | | |
|---|---|---|---|
| 3,827,916 A | 8/1974 | Fagan, Jr. | |
| 3,960,599 A | 6/1976 | Reynier et al. | |
| 4,053,687 A | 10/1977 | Coibion et al. | |
| 4,091,181 A | 5/1978 | Merritt, Jr. | |
| 4,220,695 A | 9/1980 | Ishida et al. | |
| 4,224,387 A | 9/1980 | Nakayama | |
| 4,262,064 A | 4/1981 | Nagle | |
| 4,321,316 A | 3/1982 | Kuehl | |
| 4,487,819 A | 12/1984 | Koga | |
| 4,520,085 A | 5/1985 | Wyser | |
| 4,539,271 A | 9/1985 | Crabtree | |
| 4,554,226 A * | 11/1985 | Simonton | H01M 2/204 429/153 |
| 4,664,989 A | 5/1987 | Johnson | |
| 4,927,719 A | 5/1990 | Ashihara et al. | |
| 5,128,219 A | 7/1992 | Kohler et al. | |
| 5,273,842 A | 12/1993 | Yamahira et al. | |
| 5,356,736 A | 10/1994 | Kita et al. | |
| 5,378,560 A | 1/1995 | Tomiyama | |
| 5,432,027 A | 7/1995 | Tuttle et al. | |
| 5,470,357 A | 11/1995 | Schmutz et al. | |
| 5,567,538 A | 10/1996 | Oltman et al. | |
| 5,603,737 A | 2/1997 | Marincic et al. | |
| 5,626,988 A | 5/1997 | Daniel-Ivad et al. | |
| 5,631,104 A | 5/1997 | Zhong et al. | |
| 5,639,569 A | 6/1997 | Köhler et al. | |
| 5,698,340 A | 12/1997 | Xue et al. | |
| 5,792,574 A | 8/1998 | Mitate et al. | |
| 5,912,091 A | 6/1999 | Daio et al. | |
| 5,964,902 A | 10/1999 | Mao et al. | |
| 6,042,625 A | 3/2000 | Daio et al. | |
| 6,045,944 A | 4/2000 | Okada et al. | |
| 6,066,184 A | 5/2000 | Brenner | |
| 6,143,440 A | 11/2000 | Volz et al. | |
| 6,221,524 B1 | 4/2001 | Andrew et al. | |
| 6,245,452 B1 | 6/2001 | Oltman | |
| 6,265,100 B1 | 7/2001 | Saaski et al. | |
| 6,277,522 B1 | 8/2001 | Omaru et al. | |
| 6,277,752 B1 | 8/2001 | Chen | |
| 6,287,719 B1 | 9/2001 | Bailey | |
| 6,312,848 B1 | 11/2001 | Kilb et al. | |
| 6,443,999 B1 | 9/2002 | Cantave et al. | |
| 6,468,691 B1 | 10/2002 | Malay et al. | |
| 6,495,293 B1 | 12/2002 | Arai et al. | |
| 6,516,266 B2 | 2/2003 | Shoji | |
| 6,682,853 B2 | 1/2004 | Kimijima et al. | |
| 6,723,466 B2 | 4/2004 | Oogami et al. | |
| 6,884,541 B2 | 4/2005 | Enomoto et al. | |
| 6,896,994 B2 | 5/2005 | Urairi et al. | |
| 6,964,690 B2 | 11/2005 | Goda et al. | |
| 7,108,941 B2 | 9/2006 | Hayashi et al. | |
| 7,195,840 B2 | 3/2007 | Kaun | |
| 7,276,092 B2 | 10/2007 | Holl et al. |
| 7,341,802 B1 | 3/2008 | Ota et al. |
| 7,432,014 B2 | 10/2008 | Konishiike et al. |
| 7,455,929 B2 | 11/2008 | Dopp et al. |
| 7,488,553 B2 | 2/2009 | Tsukamoto et al. |
| 7,566,515 B2 | 7/2009 | Suzuki et al. |
| 7,582,387 B2 | 9/2009 | Howard et al. |
| 7,641,992 B2 | 1/2010 | Howard et al. |
| 7,642,013 B2 | 1/2010 | Howard et al. |
| 7,662,509 B2 | 2/2010 | Howard et al. |
| 7,745,041 B2 | 6/2010 | Kozuki et al. |
| 7,794,869 B2 | 9/2010 | Howard et al. |
| 7,803,481 B2 | 9/2010 | Howard et al. |
| 7,858,236 B2 | 12/2010 | Howard et al. |
| 7,883,790 B2 | 2/2011 | Howard et al. |
| 7,931,980 B2 | 4/2011 | Kwak et al. |
| 7,951,476 B2 | 5/2011 | Kim |
| 7,981,541 B2 | 7/2011 | Sato et al. |
| 8,021,775 B2 | 9/2011 | Kaun |
| 8,048,570 B2 | 11/2011 | Visco et al. |
| 8,236,441 B2 | 8/2012 | Gardner et al. |
| 8,435,658 B2 | 5/2013 | Yamashita et al. |
| 8,465,860 B2 | 6/2013 | Pozin et al. |
| 8,703,327 B2 | 4/2014 | Kim et al. |
| 9,077,022 B2 | 7/2015 | Howard et al. |
| 9,899,640 B2 | 2/2018 | Yabushita et al. |
| 2001/0009737 A1 | 7/2001 | Lane |
| 2001/0016282 A1 | 8/2001 | Kilb et al. |
| 2001/0053617 A1 | 12/2001 | Shoji |
| 2002/0004171 A1 | 1/2002 | Kimijima et al. |
| 2002/0034680 A1 | 3/2002 | Inoue et al. |
| 2002/0106559 A1 | 8/2002 | Takahashi et al. |
| 2002/0146621 A1 | 10/2002 | Yageta et al. |
| 2002/0192559 A1 | 12/2002 | Yoshimura et al. |
| 2003/0003370 A1 | 1/2003 | Arai et al. |
| 2003/0013007 A1 | 1/2003 | Kaun |
| 2003/0035993 A1 | 2/2003 | Enomoto et al. |
| 2003/0068557 A1 | 4/2003 | Kumashiro et al. |
| 2003/0077505 A1 | 4/2003 | Goda et al. |
| 2003/0138693 A1 | 7/2003 | Suzuki et al. |
| 2003/0162088 A1 | 8/2003 | Nakanishi et al. |
| 2003/0175589 A1 | 9/2003 | Kaminaka et al. |
| 2003/0193317 A1 | 10/2003 | Shimamura et al. |
| 2004/0029004 A1 | 2/2004 | Miyaki |
| 2004/0048151 A1 | 3/2004 | Hayashi et al. |
| 2004/0048160 A1 | 3/2004 | Omaru |
| 2004/0081895 A1 | 4/2004 | Adachi et al. |
| 2004/0110061 A1 | 6/2004 | Haug et al. |
| 2004/0115521 A1 | 6/2004 | Cho |
| 2004/0185338 A1 | 9/2004 | Holl et al. |
| 2004/0202933 A1 | 10/2004 | Yamaki et al. |
| 2005/0042506 A1 | 2/2005 | Tomimoto et al. |
| 2005/0058904 A1 | 3/2005 | Kano et al. |
| 2005/0064283 A1 | 3/2005 | Anderson et al. |
| 2005/0074667 A1 | 4/2005 | Yang |
| 2005/0142440 A1 | 6/2005 | Yamaki et al. |
| 2005/0171383 A1 | 8/2005 | Arai et al. |
| 2005/0181276 A1 | 8/2005 | Miyaki |
| 2005/0233212 A1 | 10/2005 | Kaun |
| 2005/0271938 A1 | 12/2005 | Suzuki et al. |
| 2005/0277021 A1 | 12/2005 | Kozuki et al. |
| 2006/0051662 A1 | 3/2006 | Kwak et al. |
| 2006/0093871 A1 | 5/2006 | Howard et al. |
| 2006/0093872 A1 | 5/2006 | Howard et al. |
| 2006/0093894 A1 | 5/2006 | Scott et al. |
| 2006/0093918 A1 | 5/2006 | Howard et al. |
| 2006/0093923 A1 | 5/2006 | Howard et al. |
| 2006/0124973 A1 | 6/2006 | Arai et al. |
| 2006/0183020 A1 | 8/2006 | Davidson et al. |
| 2006/0228629 A1 | 10/2006 | Christian et al. |
| 2007/0037058 A1 | 2/2007 | Visco et al. |
| 2007/0122698 A1 | 5/2007 | Mitchell et al. |
| 2007/0172728 A1 | 7/2007 | Yamashita et al. |
| 2007/0200101 A1 | 8/2007 | Asao et al. |
| 2008/0003500 A1 | 1/2008 | Issaev et al. |
| 2008/0003503 A1 | 1/2008 | Kawakami et al. |
| 2008/0050652 A1 | 2/2008 | Hirose et al. |
| 2008/0240480 A1 | 10/2008 | Pinnell et al. |
| 2008/0241645 A1 | 10/2008 | Pinnell et al. |

(56) References Cited

U.S. PATENT DOCUMENTS

| | | |
|---|---|---|
| 2008/0248384 A1 | 10/2008 | Yabushita et al. |
| 2008/0318126 A1 | 12/2008 | Ishii |
| 2009/0123840 A1 | 5/2009 | Shirane et al. |
| 2009/0186263 A1 | 7/2009 | Pozin et al. |
| 2009/0208849 A1 | 8/2009 | Pozin et al. |
| 2009/0286158 A1 | 11/2009 | Howard et al. |
| 2009/0325062 A1 | 12/2009 | Brenner et al. |
| 2010/0009245 A1 | 1/2010 | Howard et al. |
| 2010/0015528 A1 | 1/2010 | Howard et al. |
| 2010/0076523 A1 | 3/2010 | Howard et al. |
| 2010/0196756 A1 | 8/2010 | Wakita et al. |
| 2010/0227217 A1 | 9/2010 | Fujikawa et al. |
| 2010/0247984 A1 | 9/2010 | Yamashita et al. |
| 2010/0266893 A1 | 10/2010 | Martin et al. |
| 2011/0091753 A1 | 4/2011 | Wang et al. |
| 2011/0133699 A1 | 6/2011 | Howard et al. |
| 2011/0200871 A1 | 8/2011 | Pytlik et al. |
| 2012/0015224 A1 | 1/2012 | Pytlik et al. |
| 2012/0028110 A1 | 2/2012 | Brenner |
| 2012/0058386 A1 | 3/2012 | Wyser et al. |
| 2012/0100406 A1 | 4/2012 | Gaugler |
| 2013/0130066 A1 | 5/2013 | Pytlik et al. |
| 2013/0216881 A1 | 8/2013 | Gaugler |

FOREIGN PATENT DOCUMENTS

| | | |
|---|---|---|
| CN | 2502410 | 7/2002 |
| CN | 1490891 A | 4/2004 |
| CN | 2632871 | 8/2004 |
| CN | 1630126 | 6/2005 |
| CN | 1744347 | 3/2006 |
| CN | 2847540 Y | 12/2006 |
| CN | 2874790 | 2/2007 |
| CN | 1960040 | 5/2007 |
| CN | 101120462 A | 2/2008 |
| CN | 101202357 | 6/2008 |
| CN | 101217188 | 7/2008 |
| CN | 101286572 | 10/2008 |
| CN | 101517820 A | 8/2009 |
| CN | 201440429 U | 4/2010 |
| DE | 1 471 758 A1 | 5/1969 |
| DE | 31 13 309 A1 | 10/1982 |
| DE | 36 38 793 A1 | 5/1988 |
| DE | 196 47 593 A1 | 5/1998 |
| DE | 697 00 312 T2 | 2/2000 |
| DE | 69700312 T2 | 2/2000 |
| DE | 198 57 638 A1 | 6/2000 |
| DE | 10313830 A1 | 10/2007 |
| DE | 10 2009 008 859 A1 | 8/2010 |
| DE | 10 2009 017 514 A1 | 10/2010 |
| EP | 0202857 A2 | 11/1986 |
| EP | 0 202 857 B1 | 7/1991 |
| EP | 1137091 A1 | 9/2001 |
| EP | 1205985 A1 | 5/2002 |
| EP | 1315220 A1 | 5/2003 |
| EP | 1318561 | 6/2003 |
| EP | 1 339 115 | 8/2003 |
| EP | 1 372 209 A1 | 12/2003 |
| EP | 1 808 916 A1 | 7/2007 |
| EP | 1873846 A1 | 1/2008 |
| EP | 1886364 A1 | 2/2008 |
| EP | 1 968 134 A1 | 9/2008 |
| EP | 1968134 A1 | 9/2008 |
| GB | 1088271 A | 10/1967 |
| GB | 2 110 464 A | 6/1983 |
| JP | 58-10375 | 1/1983 |
| JP | S5842167 A | 3/1983 |
| JP | 58-154178 | 9/1983 |
| JP | 59-78460 | 5/1984 |
| JP | 60-148058 | 8/1985 |
| JP | S62-113358 A | 5/1987 |
| JP | 62-139265 | 6/1987 |
| JP | 62-272472 | 11/1987 |
| JP | 63-285878 | 11/1988 |
| JP | 1-307176 A | 12/1989 |
| JP | H01309254 A | 12/1989 |
| JP | 2-56871 | 2/1990 |
| JP | 2-60072 | 2/1990 |
| JP | H03-225748 A | 10/1991 |
| JP | 4-249073 | 9/1992 |
| JP | 5-121056 A | 5/1993 |
| JP | 6-96750 | 4/1994 |
| JP | 7-153467 | 6/1995 |
| JP | 7-153488 A | 6/1995 |
| JP | 8-293299 A | 11/1996 |
| JP | 11-40189 | 2/1999 |
| JP | 11-135101 | 5/1999 |
| JP | H11176414 A | 7/1999 |
| JP | 2937456 B2 † | 8/1999 |
| JP | H11245066 A | 9/1999 |
| JP | 11-345626 | 12/1999 |
| JP | 11-354150 | 12/1999 |
| JP | 2000-77040 A | 3/2000 |
| JP | 2000082486 A | 3/2000 |
| JP | 2000-164259 A | 6/2000 |
| JP | 2000156218 A | 6/2000 |
| JP | 2000331717 A | 11/2000 |
| JP | 2002-042744 A | 2/2002 |
| JP | 2002-100408 A | 4/2002 |
| JP | 2002-134073 A | 5/2002 |
| JP | 2002-134096 A | 5/2002 |
| JP | 2002-164076 A | 6/2002 |
| JP | 2002-289257 A | 10/2002 |
| JP | 2002-289259 A | 10/2002 |
| JP | 2002-289260 A | 10/2002 |
| JP | 2002-298803 A | 10/2002 |
| JP | 2002-324584 A | 11/2002 |
| JP | 2002-352789 A | 12/2002 |
| JP | 2003-31266 A | 1/2003 |
| JP | 2003-077543 A | 3/2003 |
| JP | 2003-123830 A | 4/2003 |
| JP | 2003217562 A | 7/2003 |
| JP | 2003-249201 A | 9/2003 |
| JP | 2004-139800 A | 5/2004 |
| JP | 2004-158318 A | 6/2004 |
| JP | 2004-362968 A | 12/2004 |
| JP | 2006-040596 A | 2/2006 |
| JP | 3902330 B2 | 4/2007 |
| JP | 2007-200683 A | 8/2007 |
| JP | 2007-220601 A | 8/2007 |
| JP | 2007207535 A | 8/2007 |
| JP | 2007-294111 A | 11/2007 |
| JP | 2007294111 A2 † | 11/2007 |
| JP | 2008-047303 A | 2/2008 |
| JP | 2008103109 A | 5/2008 |
| JP | 2008198552 A | 8/2008 |
| JP | 2008-251192 A | 10/2008 |
| JP | 2008-262825 * | 10/2008 .......... H01M 2/0222 |
| JP | 2008-262825 A | 10/2008 |
| JP | 2008-262826 A | 10/2008 |
| JP | 2008-262827 A | 10/2008 |
| JP | 2009-199761 A | 9/2009 |
| KR | 20030087316 A | 11/2003 |
| WO | WO 2008/109025 A1 | 9/2008 |
| WO | WO 2008/117215 A1 | 10/2008 |
| WO | WO 2008118478 A1 | 10/2008 |
| WO | 2010/089152 A1 | 8/2010 |

OTHER PUBLICATIONS

Linden, D., et al., "Handbook of Batteries," 2002, Third Edition, The McGraw-Hill Companies, Inc., Sections 11.4, 11.4.1, 14.1, 14.5.2, 14.8 and 14.8.2, and Figs. 11.2, 11.5, 14.38, 34.13, 35.30 and 35.32.

Official Action dated Mar. 27, 2014 of related U.S. Appl. No. 13/146,669.

Official Action dated Sep. 2, 2014 of related U.S. Appl. No. 13/146,669.

"Button cell", *Electropedia*, International Electrotechnical Commission, Apr. 2004.

Official Action dated May 28, 2019, of counterpart U.S. Appl. No. 15/699,435.

(56) References Cited

OTHER PUBLICATIONS

Guoshun, Zhang et al. "Application of Auto Laser Welding in Rechargeable Battery Manufacturing," Chinese Journal of Lasers, vol. 35, No. 11, Nov. 2008.
Qu, Guoqiang, "Initial Analysis on the Working Principle of Through the Partition Welding," Feb. 1989.
Yi, Si-ping et al. "Laser Auto-Welding for Lithium Battery Tab," Chinese Journal of Power Sources, vol. 29, No. 2, pp. 80-81, Feb. 2005.
"Complaint for Patent Infringement" of U.S. Pat. No. 9,153,835; U.S. Pat. No. 9,496,581; and U.S. Pat. No. 9,799,913 against Amazon.com, Inc., Feb. 24, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against Best Buy Co., Inc., Feb. 24, 2020.
"Complaint for Patent Infringement" of U.S. Pat. No. 9,153,835; U.S. Pat. No. 9,496,581; and U.S. Pat. No. 9,799,913 against Costco Wholesale Corporation, Feb. 24, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against Audio Partnership LLC and Audio Partnership PLC, Mar. 3, 2020.
"Complaint for Patent Infringement" of U.S. Pat. No. 9,153,835; U.S. Pat. No. 9,496,581; U.S. Pat. No. 9,799,913; and U.S. Pat. No. 9,799,858 against PEAG, LLC, Mar. 4, 2020.
Machine English translation of "Compact Battery" by Kobayashi Yoshikazu in JP 2007294111 (A)—Nov. 8, 2007 (Year: 2007).
"Notification of invalidation request acceptance" against Chinese Patent No. 201080036551.3, Jan. 2020.
"Annulment" against EP 2 394 324 B1, Jan. 22, 2020.
"Complaint for Patent Infringement" of U.S. Pat. No. 9,153,835; U.S. Pat. No. 9,496,581; and U.S. Pat. No. 9,799,913 against Samsung Electronics America, Inc., Feb. 5, 2020.
U.S. Appl. No. 16/812,482, filed Mar. 9, 2020.
U.S. Appl. No. 16/813,776, filed Mar. 10, 2020.
U.S. Appl. No. 16/810,976, filed Mar. 6, 2020.
U.S. Appl. No. 16/810,998, filed Mar. 6, 2020.
U.S. Appl. No. 16/792,420, filed Feb. 17, 2020.
U.S. Appl. No. 16/796,977, filed Feb. 21, 2020.
U.S. Appl. No. 16/798,509, filed Feb. 24, 2020.
"Notice of acceptance of request for invalidation" against Chinese patent application No. 201080007121.9, dated Jun. 17, 2020
InvenTek Corp., "Our Technology," Dec. 6, 2004, https://web.archive.org/web/20041206230046/http://inventekcorp.com/page3.html.
InvenTek Corporation, "Powerful Design: Technology," Nov. 22, 2007, https://web.archive.org/web/20071122010915/http://inventekcorp.com/technology.html.
InvenTek Corporation, "Powerful Design: Partners," Nov. 22, 2007, https://web.archive.org/web/20071122011734/http://inventekcorp.com/partners.html.
Saft Specialty Battery Group, "Premium lithium battery LM 17130," Doc. No. 31089-2-0908, Sep. 2008.
Saft, "Premium lithium battery LM 22150," DOC N° 32040-2-0313, Mar. 2013.
Saft Specialty Battery Group, "Premium lithium battery LO 34 SX," Doc N° 31099-2-0411, Apr. 2011.
Saft Specialty Battery Group, "Rechargeable lithium-ion battery VL 34480," Doc. N° 54054-2-0607, Jun. 2007.
Saft, "Saft lithium batteries: Selector guide," Doc. N° 54083-2-0320, Mar. 2020.
Saft, "Saft lithium batteries: Selector guide," Doc. N° 54083-2-0613, Jun. 2013.
Saft Specialty Battery Group, "Saft lithium-ion rechargeable batteries for transportable power applications," Doc. N° 54047-2-0706, Jul. 2006.
Ultralife Corporation, "UB0006," https://www.ultralifecorporation.com/ECommerce/product/ub0006/type-ba-5367-33v-limno2, retrieved Jul. 15, 2020.
Ultralife Batteries, Inc., "UBOOO6: BA-5367/U" https://web.archive.org/web/20061109153052/http://www.ultralifebatteries.com/datasheet.php?ID=U80006#top, Nov. 9, 2006.
Ultralife Batteries, Inc., "BA-5367/U Technical Datasheet," Aug. 4, 2006.
Ultralife Corporation, "BA-5367/U Technical Datasheet," Aug. 27, 2015.
Ultralife Batteries, Inc., "Product Summary Guide: Technical Datasheet," Sep. 27, 2006.
Ultralife Batteries, Inc., "Ultralife: Lithium-Manganese Dioxide Primary and Lithium Ion Rechargeable Batteries," Dec. 13, 2004.
Ultralife Corporation, "Lithium Carbon Mono-fluoride / Manganese Dioxide Hybrid Application Guide," Apr. 2, 2014.
Defendants' P.R. 3-3 Invalidity Contentions, Jul. 10, 2020.
Petition for Inter Partes Review of U.S. Pat. No. 9,799,858, Jul. 7, 2020.
Petition for Inter Partes Review of U.S. Pat. No. 9,153,835, Jul. 7, 2020.
Petition for Inter Partes Review of U.S. Pat. No. 9,496,581, Jul. 7, 2020.
Petition for Inter Partes Review of U.S. Pat. No. 9,799,913, Jul. 7, 2020.
Exhibit 1 of Defendant's Invalidity Contentions, Jul. 10, 2020.
Exhibit 2 of Defendant's Invalidity Contentions, Jul. 10, 2020.
Exhibit 3 of Defendant's Invalidity Contentions, Jul. 10, 2020.
Exhibit 4 of Defendant's Invalidity Contentions, Jul. 10, 2020.
Exhibit 5 of Defendant's Invalidity Contentions, Jul. 10, 2020.
Exhibit 6 of Defendant's Invalidity Contentions, Jul. 10, 2020.
Exhibit 7 of Defendant's Invalidity Contentions, Jul. 10, 2020.
Exhibit 8 of Defendant's Invalidity Contentions, Jul. 10, 2020.
Exhibit 9 of Defendant's Invalidity Contentions, Jul. 10, 2020.
Exhibit 10 of Defendant's Invalidity Contentions, Jul. 10, 2020.
Exhibit 11 of Defendant's Invalidity Contentions, Jul. 10, 2020.
Jul. 10, 2020 Statement of Thomas Kaun.

\* cited by examiner
† cited by third party

BUTTON CELL HAVING WINDING ELECTRODE AND METHOD FOR THE PRODUCTION THEREOF

RELATED APPLICATIONS

This is a divisional application of U.S. application Ser. No. 13/378,117 filed Dec. 14, 2011, which is a § 371 of International Application No. PCT/EP2010/058637, with an international filing date of Jun. 18, 2010 (WO 2010/146154 A2, published Dec. 23, 2010), which is based on German Patent Application Nos. 10 2009 030 359.6, filed Jun. 18, 2009, and 10 2009 060 800.1, filed Dec. 31, 2009, the subject matter of which is incorporated by reference.

TECHNICAL FIELD

This disclosure relates to button cells having a housing consisting of two metal housing halves that contains a wound electrode separator assembly, and to a method for its production.

BACKGROUND

Button cells conventionally comprise a housing consisting of two housing halves: a cell cup and a cell top. These may, for example, be produced as stamped parts from nickel-plated deep-drawn sheet metal. Usually, the cell cup is positively poled and the housing top negatively poled. The housing may contain a very wide variety of electrochemical systems, for example, zinc/$MnO_2$, primary and secondary lithium systems, or secondary systems such as nickel/cadmium or nickel/metal hydride.

The liquid-tight closure of button cells is conventionally carried out by crimping the edge of the cell cup over the edge of the cell top, in combination with a plastic ring which is arranged between the cell cup and the cell top and is used simultaneously as a sealing element and for electrical insulation of the cell cup and the cell top. Such button cells are described, for example, in DE 31 13 309.

As an alternative, however, it is also possible to manufacture button cells in which the cell cup and the cell top are held together in the axial direction exclusively by a force-fit connection, and which correspondingly do not have a crimped cup edge. Such button cells and a method for their production are described in unpublished German patent application 10 2009 017 514.8. Regardless of the various advantages which such button cells without crimping may present, they nevertheless cannot withstand such high stresses in the axial direction as comparable button cells with a crimped cup edge, especially as regards axial mechanical loads which originate from inside the button cell. For example, the electrodes of rechargeable lithium ion systems are constantly subjected to volume changes during charging and discharging processes. In button cells without crimping, the axial forces occurring in this case can naturally cause leaks more easily compared with button cells with crimping.

A solution to this problem may be found in unpublished German patent applications 10 2009 030 359.6 and 10 2009 008 859.8. Inter alia, references may be found therein to button cells comprising a housing having a plane bottom region and a plane top region parallel thereto, an assembly consisting of flat electrode layers and separator layers in the form of a preferably spiral-shaped electrode winding being arranged in the housing such that the end sides of the winding face in the direction of the plane bottom region and the plane top region. The electrode layers of the winding are thus oriented essentially orthogonally to the plane bottom and top regions of the housing. As a result of this, radial forces such as occur during the aforementioned charging and discharging processes of lithium ion systems can in principle be absorbed better than in the case of conventional lithium ion button cells, in which electrode layers are arranged stacked in parallel alignment with the plane bottom and top regions.

Windings consisting of flat electrode layers and separator layers can be produced quite straightforwardly using known methods (see, for example, DE 36 38 793) by the electrodes being applied, in particular laminated, particularly in the form of strips, flat onto a separator provided as an endless band. The assembly consisting of the electrodes and separators is generally wound on a so-called "winding mandrel." After the winding has been removed from the winding mandrel, an axial cavity is left at the center of the winding, the effect of which is that the winding may possibly expand into this cavity. This, however, can sometimes lead to problems in the electrical contact of the electrodes with the metal housing halves.

It could therefore be helpful to provide a button cell in which the aforementioned problems do not occur, or only occur to a greatly reduced extent.

SUMMARY

I provide a button cell including two metal housing halves separated from one another by an electrically insulating seal forming a housing having a plane bottom region and a plane top region parallel thereto, an electrode separator assembly including at least one positive electrode and at least one negative electrode inside the housing, the assembly provided in the form of a winding, end sides of which face in a direction of the plane bottom region and the plane top region, and metal conductors electrically connected to the at least one positive electrode and the at least one negative electrode, respectively, to one of the housing halves, wherein at least one of the conductors is connected to the respective housing half by welding wherein weld beads and/or weld spots pass through the housing.

I also provide a method of producing button cells including (a) providing a first and a second metal housing half, (b) placing an electrode separator assembly including a positive electrode and a negative electrode in one of the housing halves, wherein a metal conductor is bonded to at least one of the electrodes, (c) assembling the two housing halves, and, subsequently, (d) laser welding at least one of the conductors to the inner side of one of the metal housing halves.

I further provide a button cell including two metal housing components separated from one another by an electrically insulating seal forming a housing having a substantially planar bottom region and a substantially planar top region substantially parallel thereto, an electrode separator assembly including at least one positive electrode and at least one negative electrode inside the housing, the assembly provided as a winding, end sides of which face in a direction of the substantially planar bottom region and the substantially planar top region such that layers of the winding are oriented essentially orthogonally to the substantially planar bottom region and substantially planar top region, and metal conductors electrically connected to the at least one positive electrode and the at least one negative electrode and, respectively, to one of the housing components, wherein the button cell has a height-to-diameter ratio less than one, at least one of the conductors is a metal foil and at least one subsection of the at least one conductor bears flat on an inner side of the housing components in the substantially planar bottom or top region of the housing and the at least one conductor connects to the housing in this region by one or more spot-shaped and/or linear welded connections.

I yet further provide a method of producing the button cell, including (a) providing a first and a second metal housing component, (b) placing the electrode separator assembly including the positive electrode and the negative electrode in one of the housing components, the metal conductor being bonded to at least one of the electrodes, (c) assembling the two housing components, optionally with a separate step of sealing the housing, and (d) welding at least one of the conductors to the inner side of one of the metal housing components, wherein step (d) is carried out after step (c).

DETAILED DESCRIPTION

Figure 1A:
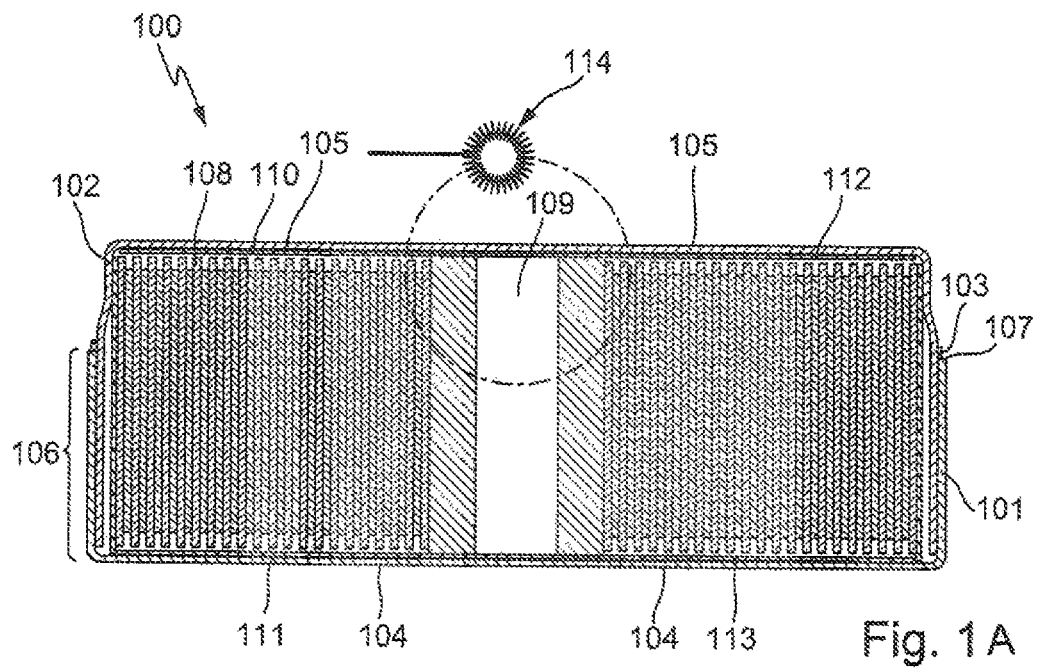
FIGS. 1A and 1B schematically show a cross section of a preferred example of a button cell 100.

My button cell always comprises two metal housing halves separated from one another by an electrically insulating seal and forming a housing having a plane bottom region and a plane top region parallel thereto. As mentioned in the introduction, the two housing halves are generally a so-called "housing cup" and a "housing top." In particular, nickel-plated steel or sheet metal are preferred as the material for the housing halves. Trimetals, in particular, are furthermore suitable as the metallic material, for example, ones comprising the sequence nickel, steel (or stainless steel) and copper (in which case the nickel layer preferably forms the outer side of the button cell housing and the copper layer preferably forms the inner side).

As the seal, it is, for example, possible to use an injection-molded seal or a film seal. The latter are described, for example, in DE 196 47 593.

At least one positive electrode and at least one negative electrode are arranged inside the housing, specifically each in the form of flat electrode layers. The electrodes are preferably connected to one another by at least one flat separator. The electrodes are preferably laminated or adhesively bonded onto this separator. The electrodes and the separator generally each have a thickness only in the µm range. A porous plastic film is generally used as the separator.

This assembly is provided in the form of a winding, particularly in the form of a spiral-shaped winding, in the housing of a button cell, the winding being arranged such that its end sides face in the direction of the plane bottom region and the plane top region of the housing. Full reference is hereby made to the description of such windings, and button cells comprising such windings, in unpublished German patent applications DE 10 2009 030 359.6 and DE 10 2009 008 859.8 already mentioned above. All the preferred forms described in those applications are also intended to apply for the button cell described here and the electrode winding described here.

Besides the housing halves and the electrode separator assembly, my button cell always also comprises metal conductors which electrically connect the at least one positive electrode and/or the at least one negative electrode respectively to one of the housing halves. The conductor or conductors connected to the at least one positive electrode preferably consist of aluminum. The conductors connected to the at least one negative electrode preferably consist of nickel or copper.

On the electrode side, the conductors are preferably connected to current collectors. The latter are generally metal foils or meshes conventionally coated on both sides with active electrode material. These current collectors preferably consist of aluminum on the side of the positive electrode, and preferably nickel or copper on the side of the negative electrode. The foils or meshes have, in particular, thicknesses of 1 µm to 100 µm. The connecting of the conductors to the current collectors is preferably carried out by welding.

Particularly in respect of preferred forms of the electrode separator assembly arranged in my button cell, reference is made to DE 10 2009 030 359.6 and DE 10 2009 008 859.8. These disclose in particular preferred layer sequences and layer thicknesses for electrodes and separators, for example, an assembly comprising the layer sequence:

negative electrode/separator/positive electrode/separator or positive electrode/separator/negative electrode/separator. Assemblies comprising the layer sequences:

negative electrode/separator/positive electrode/separator/negative electrode or positive electrode/separator/negative electrode/separator/positive electrode may also be preferred. In these, the assembly therefore comprises more than one positive electrode and/or more than one negative electrode.

Particularly preferably, at least one of the electrodes of a button cell is a lithium intercalation electrode. The button cell is preferably a lithium ion battery, in particular a secondary lithium ion battery.

My button cell is distinguished particularly in that at least one of the conductors is welded to the respective housing half, preferably both the conductor connected to the at least one positive electrode and the conductor connected to the at least one negative electrode.

As has already been mentioned in the introduction, particularly in the case of lithium ion button cells the electrodes are subject to volume changes during a charging-discharging cycle, as a result of which contact problems may arise between the conductors and the housing halves. Such contact problems no longer apply when the conductors are welded to the respective housing halves.

Particularly preferably, the conductor or conductors are welded onto the inner side of the housing in the plane bottom region or the plane top region, respectively, of the housing. For this purpose, according to conventional methods the welding process must be carried out before the housing is assembled, which is very difficult to achieve in terms of production technology. Welded connections have therefore been regarded as highly disadvantageous for bonding the conductors to the inner side of the housing halves. By virtue of my method as described in more detail below, however, a solution can be provided which also has great advantages in terms of production technology.

By the welding, the at least one positive electrode and/or the at least one negative electrode are thus connected by one or more conductors directly to the plane bottom region or to the plane top region of the housing of a button cell, the housing top generally being poled negatively and the housing cup positively.

The button cell is preferably a conventional button cell having a circular plane bottom region and a circular plane top region. In some cases, the button cell may nevertheless have an oval configuration. It is, however, important that the ratio of height to diameter is preferably always less than 1. Particularly preferably, it is 0.1 to 0.9, in particular 0.15 to 0.7. The height is in this case intended to mean the shortest distance between the plane bottom region and the plane top region parallel thereto. The diameter means the maximum distance between two points on the lateral region of the button cell.

Preferably, the conductors of a button cell are flat conductors, in particular metal foils, particularly preferably rectangular, strip- or band-shaped metal foils. The foils preferably have thicknesses of 5 μm to 100 μm.

The conductors are preferably separate components bonded, in particular welded, to the electrodes, in particular to the current collectors in the electrodes. As an alternative, however, the conductors may also be uncoated sections of a current collector (sections which are free of active electrode material), in particular the uncoated ends of such a current collector. By bending these uncoated sections, in particular these uncoated ends, for example, through 90°, these ends can be connected to the bottom or top region of a button cell. There, the connecting is preferably carried out by welding.

Preferably, at least one subsection of the conductor or conductors bears flat on the inner side of the housing half or halves in the bottom and/or top region of the housing, in particular when the conductors are flat conductors such as foils. Such conductors may form a flat layer between the inner side of the housing halves and an end side of the electrode winding, and therefore a large-area electrical contact with the housing.

Since in principle both positive and negative electrodes may be exposed on the end sides of the electrode winding, however, it is necessary to avoid a short circuit between the electrodes. Particularly preferably, my button cell therefore comprises at least one separate insulating means which prevents direct electrical contact between the end sides of the winding and the conductors, in particular a subsection of the conductor or conductors which bears flat on the inner side of the housing halves. Such an insulating means may, for example, be a film, for example, a plastic adhesive film, by which the side of the conductor or conductors remote from the inner side of the button cell housing is covered.

The electrode winding of a button cell may be produced by known methods, for example, the method described in DE 36 38 793, according to which electrodes and separators are wound on a winding mandrel. After the winding has been removed from the winding mandrel, there may be an axial cavity at the center of the winding, preferably an essentially cylindrical axial cavity. In the housing of my button cell, such a cavity is delimited laterally by the winding and on the end sides by the bottom or top region of the housing, respectively, or at least by a subregion thereof. Particularly preferably, the at least one conductor is welded to one housing half or the housing halves in one of these subregions.

The axial cavity may optionally contain a winding core, which can prevent the winding from expanding uncontrolledly into the cavity.

The button cell is in particular a button cell without crimping, as is described in DE 10 2009 017 514.8 already mentioned in the introduction. Accordingly, there is preferably an exclusively force-fit connection between the housing halves. The button cell thus does not have a crimped cup edge, as is always the case with known button cells. The button cell is closed without crimping. The content of DE 10 2009 017 514.8 is also fully incorporated herein by reference. All the preferred forms described in that application are also intended to apply for the button cell described here and its housing.

As already mentioned above, welding of conductors to the inner side of button cell housings is very elaborate in terms of production technology. I overcome this problem with my method of producing button cells, which always comprises at least the following steps:

(a) providing a first and a second metal housing half (preferably a cell cup, and a cell top),
(b) placing an electrode separator assembly comprising a positive electrode and a negative electrode in one of the housing halves (preferably into the cell top), a metal conductor being bonded to at least one of the electrodes (preferably to all the electrodes),
(c) assembling the two housing halves (preferably by inserting the cell top into the cell cup), optionally with the provision of separate steps for sealing the housing (for example, fitting a seal) and
(d) welding at least one of the conductors to the inner side of one of the metal housing halves.

The components used in the method, such as the housing halves, the conductors and the electrode separator assembly, have already been described above. Reference is hereby made to the corresponding remarks.

The method is distinguished in particular in that step (d) is carried out after step (c). This means that the at least one conductor is welded to the inner side of the housing when the housing is closed. The welding must correspondingly be carried out from the outside through the housing wall of one or both housing halves.

Accordingly, I provide button cells which have weld beads and/or weld spots that pass through the housing, in particular starting from its outer side.

Particularly preferably, the conductor or conductors and the button cell housing are connected to one another by one or more spot-like and/or linear welded connections.

Welding the conductors and the housing is preferably carried out by a laser. Its operating parameters must be adapted as accurately as possible to the thickness of the housing. The power may, for example, be modulated by varying the pulse frequency. Lastly, the laser should merely ensure welding of the housing and conductors while other components such as the electrode winding should as far as possible not be damaged.

Suitable lasers are, for example, commercially available fiber lasers, i.e., solid-state lasers, in which the doped core of a glass fiber forms the active medium. The most common dopant for the laser-active fiber core is erbium. For high-power applications as in the present case, however, ytterbium and neodymium are more preferred.

Irrespective of the fact that such lasers can be adapted very finely to the respective housing thickness and conductor dimension, it is nevertheless possible that in certain cases the intensity of the laser will be selected to be too strong and the laser will penetrate through the housing wall and the conductor. For this reason, welding the conductors to the housing is particularly preferably carried out in the subregion of the bottom or top region, which delimits the axial cavity at the center of the winding on the end side. If a laser beam penetrates through the housing in this region, the winding cannot be damaged. Instead, the laser beam will be absorbed by the housing half lying opposite or by a winding core optionally arranged inside the cavity.

If possible, the conductors to be welded should bear as flatly as possible on the inner side of the housing. This may, for example, be ensured by fixing the conductors flat by an adhesive tape onto or at the end sides of an electrode winding, before the latter is inserted into the housing.

The aforementioned advantages, and further advantages thereof, are in particular also revealed by the description which now follows of the drawings. In this context, the individual features may be implemented separately or in combination with one another. The examples described merely serve for explanation and better understanding, and are in no way to be interpreted as restrictive.

Button cell 100 comprises two metal housing halves: a metal cup part 101 and a metal top part 102. With a seal 103 lying between them, the two parts are connected together in a leaktight fashion. Together, they form a housing having a plane bottom region 104 and a plane top region 105 parallel thereto. In the functional state, these two plane regions 104 and 105 form the poles of the button cell 100, from which current can be drawn by a load. The cell top 102 is inserted into the cell cup 101 so that the lateral surface regions of the cell top and the cell cup overlap, the internal radius of the cell cup 101 in the overlap region 106 being essentially constant in the direction of the rim 107. The edge of the cell 101 is thus not crimped. The button cell 100 is therefore an uncrimped button cell.

An assembly 108 of strip-shaped electrodes and strip-shaped separators is arranged inside the electrode. The assembly 108 is provided in the form of a spiral-shaped winding, the end sides of which face in the direction of the plane bottom region 104 and the plane top region 105 parallel thereto. The assembly is wound on the winding core 109 at the center of the button cell 100. The winding core is a hollow plastic cylinder, which partially fills an axial cavity at the center of the winding. The cavity itself is delimited laterally by the winding and upward and downward by corresponding circular sections of the plane cup and top regions of the button cell housing. Metal foils 110 and 111, which act as conductors and are connected to the electrodes, bear flat on these regions. These conductors are shielded from the end sides of the winding by the insulating elements 112 and 113. The latter are thin plastic films. The wall thickness of the housing in the region of the plane bottom or top region is generally between 30 µm and 400 µm. The thickness of the metal foils 110 and 111 acting as conductors generally lies between 5 µm and 100 µm.

Welding of the metal foils 110 and 111, acting as conductors, to the respective housing half, which is preferably done by the schematically represented laser 114, is preferably carried out in that subregion of the bottom region or of the top region of the button cell housing which delimits the axial cavity at the center of the winding on the end side. This creates a weld bead 115 which passes fully through the housing of the button cell 100 from the outside inward, and by which the internally lying metal foils 110 and 111 acting as conductors are firmly connected to the inner side of the housing. This can be seen clearly in the detail enlargement (FIG. 1B).

Figure 1B:
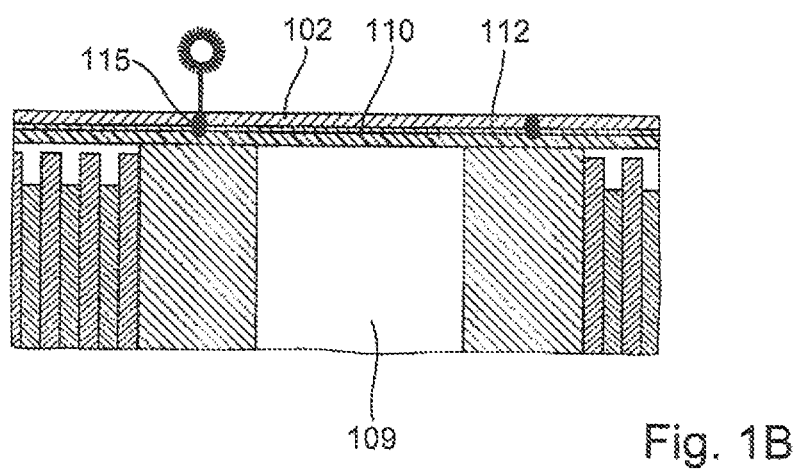
Figure 2A:
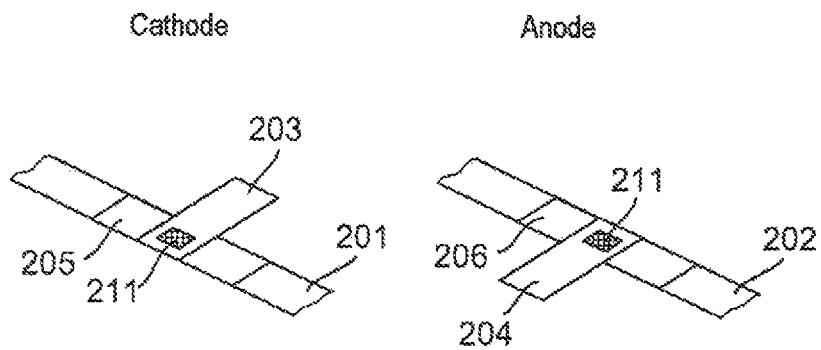
FIGS. 2A to 2C schematically show selected assembly steps of the button cell of FIGS. 1A and 1B.
Figure 2B:
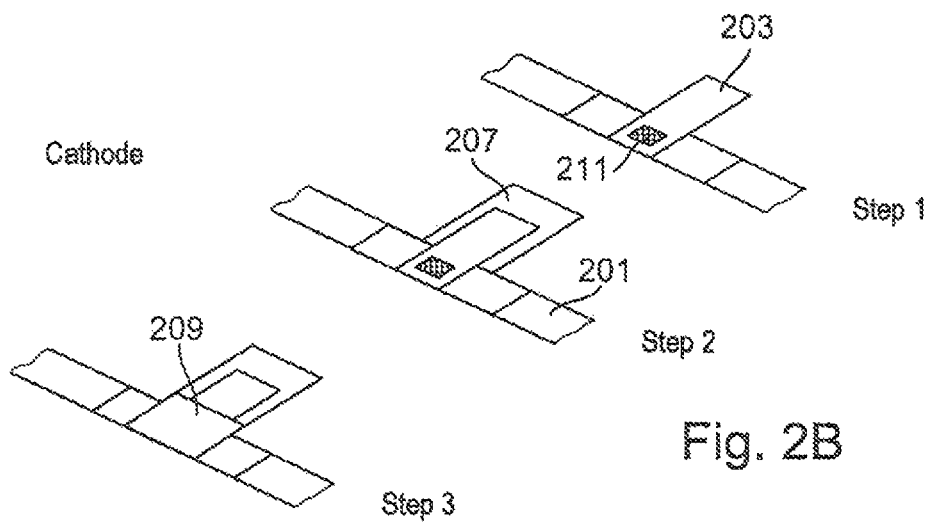
Figure 2C:
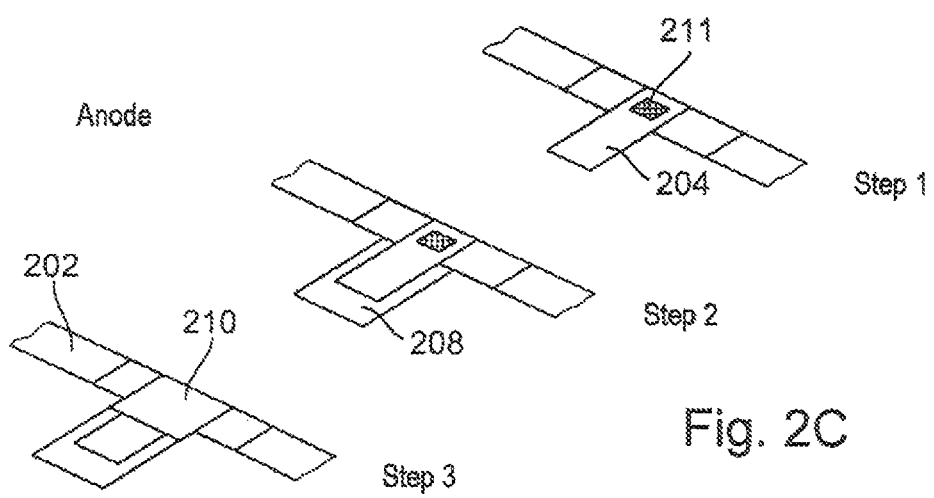

FIG. 2A to FIG. 2C represent some important steps in the production of an electrode winding, which is suitable in particular for button cells (for example, as represented in FIGS. 1A and 1B). Thus, FIG. 2A shows segmented collector foils 201 and 202 coated with active electrode material, to which conductor strips 203 and 204 offset at an angle of 90° are attached by welding. The conductor 204 on the anode side consists of nickel or copper, and the conductor 203 on the cathode side of aluminum. The conductors 203 and 204 are respectively applied in a material-free region (205, 206) of the collector foils 201 and 202. Elsewhere, they are coated with active material on both sides. The connection between the collector foils 201 and 202 and the conductors may, for example, be produced by welding in the region 211.

FIG. 2B and FIG. 2C represent the way in which the rear sides of the conductors 203 and 204 are adhesively bonded using an insulating tape 207 and 208 (for example, made of KAPTON or polypropylene) (Step 2). This insulating tape is subsequently intended to function as an insulating element, which is meant to prevent direct electrical contact between the conductors 203 and 204 and the end sides of the electrode winding which is to be produced. The conductors 203 and 204 are fixed on the front in a further step (Step 3) with further adhesive strips 209 and 210. The region 211 is bonded over in this case.

Figure 3A:
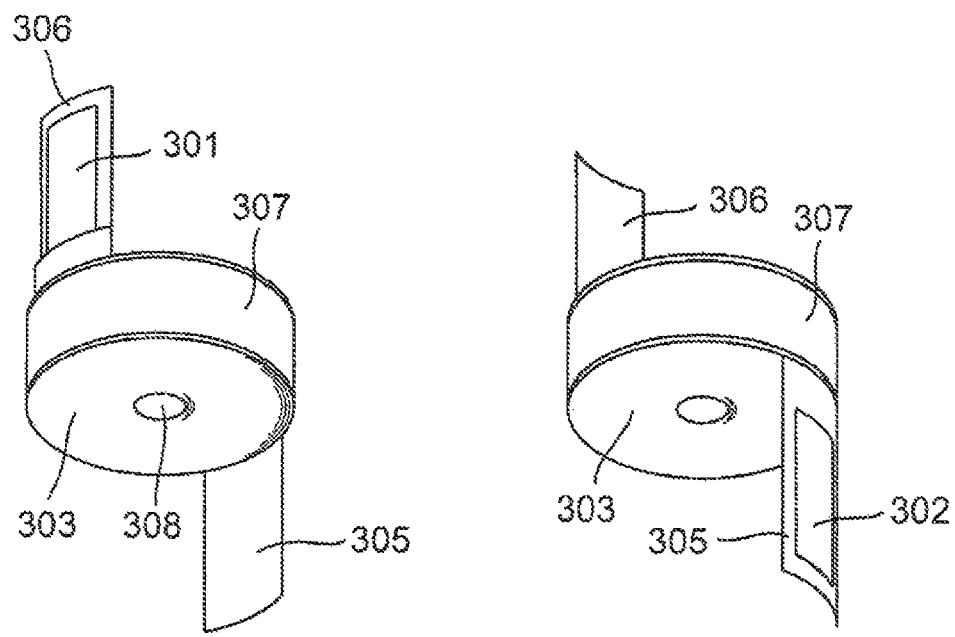
FIGS. 3A and 3B schematically show selected views of windings of the button cell.
Figure 3B:
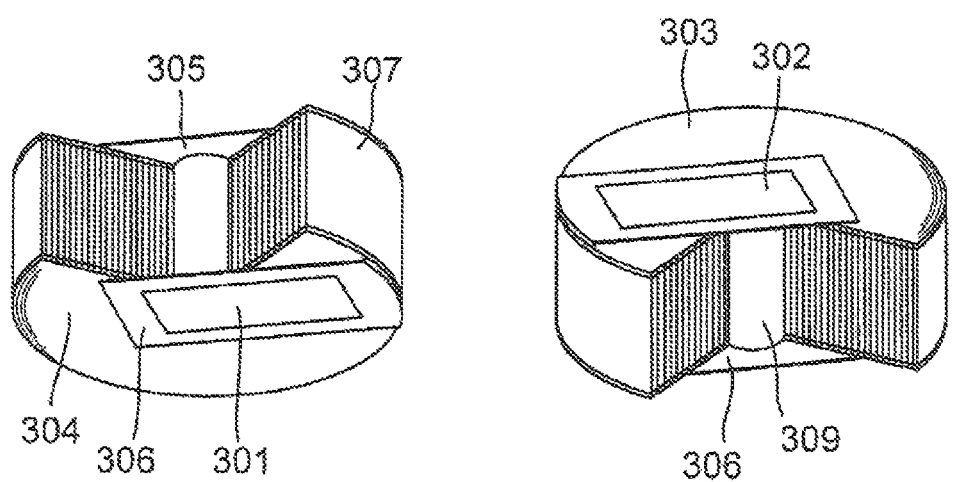

The conductor position in a winding of electrode foils obtained according to FIG. 2A to FIG. 2C can be seen clearly in FIG. 3A. Two different perspective representations of the same winding are shown (left and right). The conductor 301 (which corresponds to the conductor 204 in FIGS. 2A and 2C) and the conductor 302 (which corresponds to the conductor 203 in FIGS. 2A and 2B) are themselves aligned axially at a 90° angle to the winding direction and by folding down by 90° bear flat on the end sides 303 and 304 of the electrode winding. The insulating elements 305 and 306 (which correspond to the insulating tapes 207 and 208 in FIGS. 2B and 2C) prevent direct electrical contact between the conductors 301 and 302 and the end sides 303 and 304 of the electrode winding represented. The outer side of the winding is protected by the insulating film 307. Ideally, the conductors 301 and 302 overlap with the openings of the axial cavity 308 on the end sides, so that welding to the button cell housing can be carried out in this region. This can be seen clearly in FIG. 3B, as can the winding core 309 which fills the axial cavity 308.

Figure 4A:
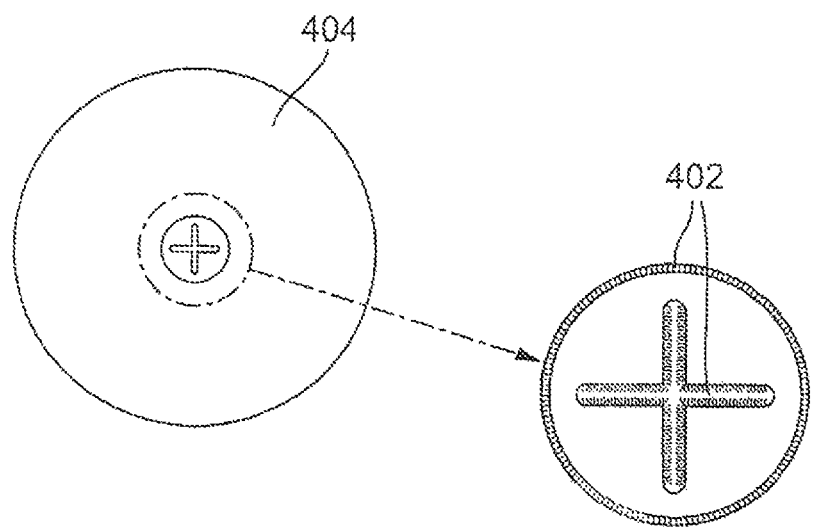
FIGS. 4A and 4B schematically show two different welds.
Figure 4B:
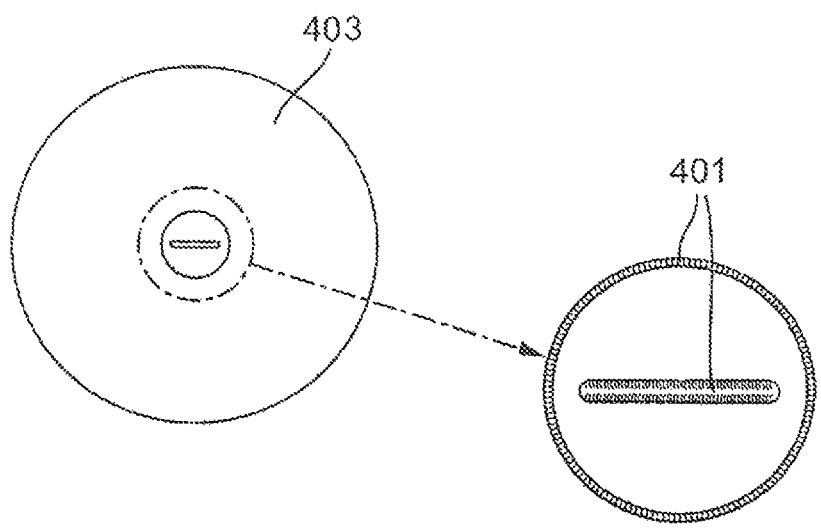

FIGS. 4A and 4B show possible welding variants. For example, it is possible to configure the weld bead as a minus sign 401 or a plus sign 402 (see the respective enlarged representations on the right) so as to indicate the polarity of the respective housing half at the same time. The plus sign 402 is preferably applied on the lower side 404 of a button cell, and the minus sign on the upper side 403.

Figure 5:
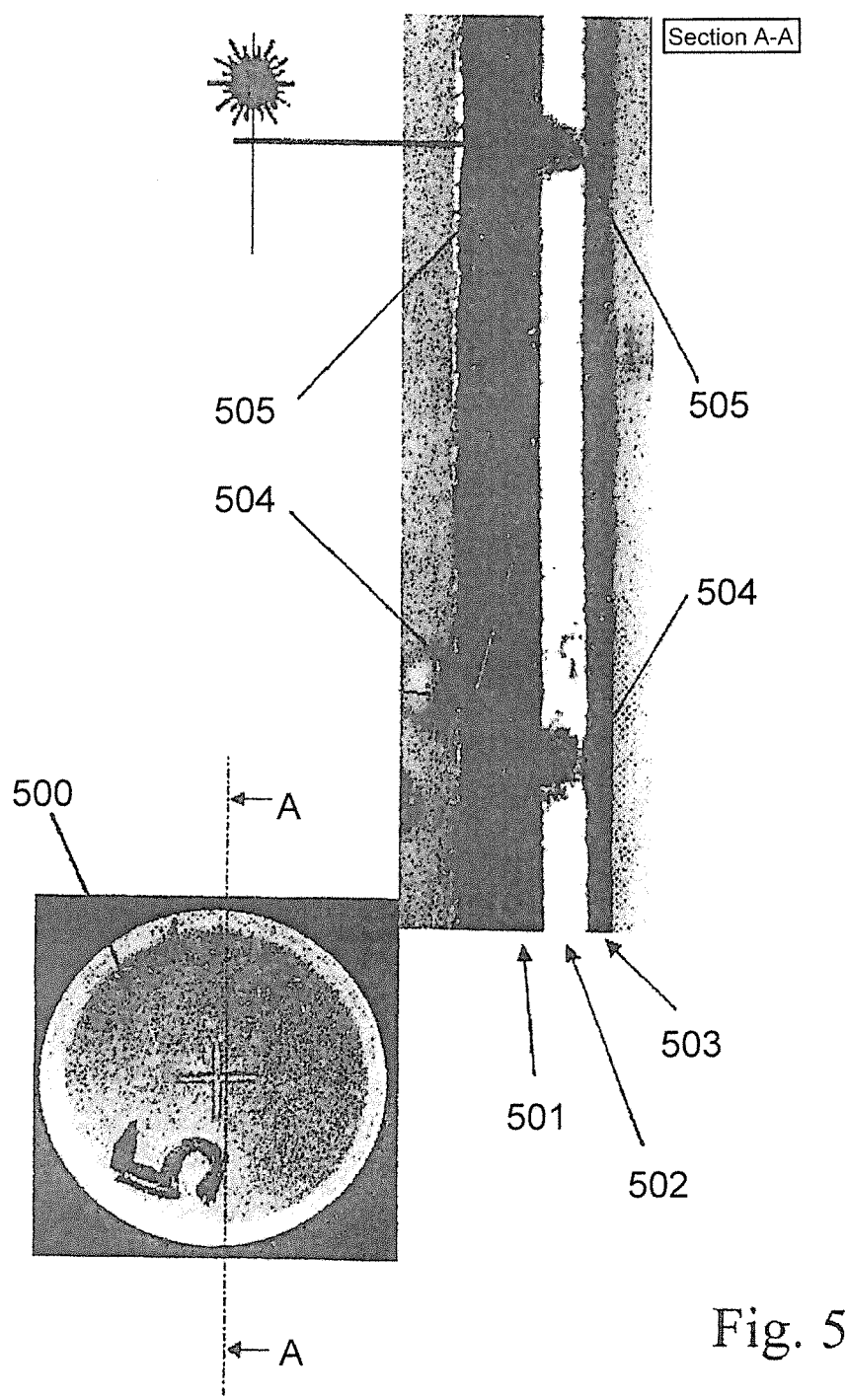
FIG. 5 shows microphotographs of a weld from top and cross-sectional views.

FIG. 5 shows an enlarged representation of a cross section through a housing half 500 of a button cell. The stainless steel cup wall 501, the aluminum conductor 502 bearing flat underneath and an insulating tape 503 of KAPTON film arranged below can be seen. The weld beads 504 and 505, which extend from the outer side of the housing inward as far as the insulating tape 503 of KAPTON film can be seen clearly. The top left image is a plan view of the cutaway plane bottom region of the housing half 500. The housing half 500 and the conductor 502 have been welded using an ytterbium-doped fiber laser of the YLR-400-AC type (manufacturing company IPG Photonics Corporation, USA). The intensity of the laser was in this case adjusted so that the insulating tape 503 was not penetrated.

What is claimed is:

1. A rechargeable button cell comprising:
a housing including metal housing halves separated from one another by an electrically insulating injection-molded seal or film seal, one of the housing halves including a planar bottom region and another housing half including a planar top region substantially parallel to the planar bottom region, the housing having a height-to-diameter ratio of less than one;
an electrode separator assembly comprising a positive electrode and a negative electrode disposed inside the housing, wherein the electrode separator assembly is in the form of a winding, end sides of the winding respectively facing in directions of the planar bottom region and the planar top region such that layers of the electrode separator assembly are oriented essentially orthogonally to the planar bottom region and the planar top region of the housing, the winding having a substantially centrally located axis and an open cavity extending along the axis interiorly of the winding, the open cavity having axially spaced opposite ends, the planar top and bottom regions of the housing each having a subregion, each subregion disposed both radially and axially adjacent one of the ends of the open cavity, the positive electrode and the negative electrode each including a current collector in the form of a metal foil or a metal mesh coated on both sides with active electrode material, and each of the current collectors comprises an uncoated section;
two metal foils functioning as conductors and electrically connecting the positive and the negative electrode to the housing halves, wherein both metal foils bear flat on an inner surface of the planar bottom region or the planar top region, one of the metal foils is attached by a weld to one of the uncoated sections and one of the planar bottom and top regions, another one of the metal foils is attached by a weld to another one of the uncoated sections and to another one of the planar bottom and top regions; and
at least one insulator disposed to prevent direct electrical contact between one of the metal foil conductors and an adjacent one of the end sides of the electrode separator assembly,
wherein the button cell is configured as a secondary lithium ion cell, and the open cavity includes no winding core.

2. The button cell according to claim 1, further comprising an insulating tape adhesively bonded to a side of the one of the metal foil conductors.

3. The button cell according to claim 1, wherein the metal foil connected to the planar bottom region is connected to the bottom region by one or more spot-shaped and/or linear welded connections.

4. The button cell according to claim 3, wherein the welded connection is disposed at the subregion of the planar bottom region.

5. The button cell according to claim 3, wherein the welded connection is disposed at the subregion of the planar top region.

6. The button cell according to claim 1, wherein the metal foil connected to the planar top region is connected to the top region by one or more spot-shaped and/or linear welded connections.

7. The button cell according to claim 1, wherein the metal foil connected to the planar bottom region is aligned axially at a 90° angle to the winding direction and folded down by 90° to bear flat on an end side of the winding.

8. The button cell according to claim 7, wherein the metal foil connected to the planar top region is aligned axially at a 90° angle to the winding direction and folded down by 90° to bear flat on an end side of the winding.

9. The button cell according to claim 1, wherein an outer side of the winding is protected by an insulating film.

10. The rechargeable button cell according to claim 1, wherein
the housing halves are a first and a second housing half,
the second housing half comprises an edge defining an opening,
the first housing half is inserted into the second housing half so that lateral surface regions of the two housing halves overlap, and
the edge of the second housing half is not crimped over an edge of the first housing half to provide liquid-tight closure of the cell.

11. A rechargeable button cell comprising:
a housing including metal housing halves separated from one another by an electrically insulating injection-molded seal or film seal, one of the housing halves including a planar bottom region and another housing half including a planar top region substantially parallel to the planar bottom region, the housing having a height-to-diameter ratio of less than one;
an electrode separator assembly comprising a positive electrode and a negative electrode disposed inside the housing, wherein the electrode separator assembly is in the form of a winding, end sides of the winding respectively facing in directions of the planar bottom region and the planar top region such that layers of the electrode separator assembly are oriented essentially orthogonally to the planar bottom region and the planar top region of the housing, the winding having a substantially centrally located axis and an open cavity extending along the axis interiorly of the winding, the open cavity having axially spaced opposite ends, the planar top and bottom regions of the housing each having a subregion, each subregion disposed both radially and axially adjacent one of the ends of the open cavity, the positive electrode and the negative electrode each including a current collector in the form of a metal foil or a metal mesh coated on both sides with active electrode material, and each of the current collectors comprises an uncoated section;
two metal foils functioning as conductors and electrically connecting the positive and the negative electrode to the housing halves, wherein both metal foils bear flat on an inner surface of the planar bottom region or the planar top region, one of the metal foils is attached by a weld to one of the uncoated sections and one of the planar bottom and top regions, another one of the metal foils is attached by a weld to another one of the uncoated sections and to another one of the planar bottom and top regions; and
at least one insulator disposed to prevent direct electrical contact between one of the metal foil conductors and an adjacent one of the end sides of the electrode separator assembly, wherein the button cell is configured as a secondary lithium ion cell, and the open cavity is defined at an outer lateral extent thereof by an inner region of the winding, the open cavity being laterally unobstructed by a winding core; and
the metal foils have a thickness of 5 μm to 100 82 m.

12. The button cell according to claim 11, further comprising an insulating tape adhesively bonded to a side of the one of the metal foil conductors.

13. The button cell according to claim 11, wherein the metal foil connected to the planar bottom region is connected to the bottom region by one or more spot-shaped and/or linear welded connections.

14. The button cell according to claim 13, wherein the welded connection is disposed at the subregion of the planar bottom region.

15. The button cell according to claim 13, wherein the welded connection is disposed at the subregion of the planar top region.

16. The button cell according to claim 11, wherein the metal foil connected to the planar top region is connected to the top region by one or more spot-shaped and/or linear welded connections.

17. The button cell according to claim 11, wherein the metal foil connected to the planar bottom region is aligned axially at a 90° angle to the winding direction and folded down by 90° to bear flat on an end side of the winding.

18. The button cell according to claim 11, wherein the metal foil connected to the planar top region is aligned axially at a 90° angle to the winding direction and folded down by 90° to bear flat on an end side of the winding.

19. The button cell according to claim 11, wherein an outer side of the winding is protected by an insulating film.

20. The rechargeable button cell according to claim 11, wherein
the housing halves are a first and a second housing half,
the second housing half comprises an edge defining an opening,
the first housing half is inserted into the second housing half so that lateral surface regions of the two housing halves overlap, and
the edge of the second housing half is not crimped over an edge of the first housing half to provide liquid-tight closure of the cell.

\* \* \* \* \*

UNITED STATES PATENT AND TRADEMARK OFFICE
CERTIFICATE OF CORRECTION

PATENT NO.      : 10,804,506 B2
APPLICATION NO. : 15/433654
DATED           : October 13, 2020
INVENTOR(S)     : Winfried Gaugler Page 1 of 1

It is certified that error appears in the above-identified patent and that said Letters Patent is hereby corrected as shown below:

In the Claims

Claim 11 (Column 10, Line 64) which reads:
"the metal foils have a thickness of 5 μm to 100 82 m"

Should read:
"the metal foils have a thickness of 5 μm to 100 μm"

Signed and Sealed this
First Day of December, 2020

Andrei Iancu
*Director of the United States Patent and Trademark Office*